US009171140B2

(12) United States Patent
Kespohl et al.

(10) Patent No.: US 9,171,140 B2
(45) Date of Patent: Oct. 27, 2015

(54) SYSTEM AND METHOD FOR UNIFIED PASSCODE PROCESSING

(71) Applicant: RESEARCH IN MOTION LIMITED, Waterloo (CA)

(72) Inventors: Klaus Kespohl, Bochum (DE); James Randolph Winter Lepp, Ottawa (CA); Nicholas James Russell, Newbury (GB)

(73) Assignee: BLACKBERRY LIMITED, Waterloo (CA)

( * ) Notice: Subject to any disclaimer, the term of this patent is extended or adjusted under 35 U.S.C. 154(b) by 160 days.

(21) Appl. No.: 13/826,440

(22) Filed: Mar. 14, 2013

(65) Prior Publication Data

US 2014/0281562 A1    Sep. 18, 2014

(51) Int. Cl.
| G06F 21/31 | (2013.01) |
| G06F 21/34 | (2013.01) |
| G06F 21/62 | (2013.01) |
| G06F 21/77 | (2013.01) |
| G06F 21/46 | (2013.01) |

(52) U.S. Cl.
CPC .............. *G06F 21/31* (2013.01); *G06F 21/34* (2013.01); *G06F 21/62* (2013.01); *G06F 21/77* (2013.01); *G06F 21/46* (2013.01)

(58) Field of Classification Search
CPC ......... G06F 21/31; G06F 21/34; G06F 21/62; G06F 21/77
USPC .................... 726/2, 4–5, 16–17; 713/182, 184
See application file for complete search history.

(56) References Cited

U.S. PATENT DOCUMENTS

| 6,609,198 | B1* | 8/2003 | Wood et al. ................... 713/155 |
| 6,904,526 | B1* | 6/2005 | Hongwei ....................... 713/183 |
| 8,499,342 | B1* | 7/2013 | Macwan ........................... 726/7 |
| 2005/0040931 | A1* | 2/2005 | Shitan ............................ 340/5.5 |
| 2006/0107323 | A1* | 5/2006 | McLean ........................... 726/23 |
| 2006/0182283 | A1* | 8/2006 | Sandhu et al. ................ 380/286 |
| 2008/0113687 | A1* | 5/2008 | Prendergast et al. ......... 455/558 |

(Continued)

FOREIGN PATENT DOCUMENTS

EP    1107623    6/2001

OTHER PUBLICATIONS

Corresponding PCT International Application No. PCT/CA2013/000549 International Search Report mailing date Sep. 27, 2013.

(Continued)

*Primary Examiner* — Hadi Armouche
*Assistant Examiner* — Sher Khan
(74) *Attorney, Agent, or Firm* — Perry + Currier Inc.

(57) ABSTRACT

A system and method for unified password processing is provided. According to an aspect, a device can receive a unified passcode. The unified passcode can be a passcode for unlocking access to the device, or can be the basis for generating additional passwords or both. The unified passcode can also be used for generating additional passcodes for unlocking additional features of the device. The generated passcodes can also be used for unlocking modules that are connected to a device such as a universal integrated circuit card (UICC). In cases where a generated passcode can be used to unlock a UICC, the generated passcode is converted to a personal identification number (PIN). The mobile interface to the UICC can be extended to include alphanumeric passwords, in addition to PINs.

17 Claims, 5 Drawing Sheets

(56) References Cited

U.S. PATENT DOCUMENTS

| | | | |
|---|---|---|---|
| 2009/0260077 A1* | 10/2009 | Zhu et al. | 726/19 |
| 2009/0282256 A1* | 11/2009 | Rakic et al. | 713/176 |
| 2009/0287637 A1* | 11/2009 | Day et al. | 707/2 |
| 2010/0169651 A1* | 7/2010 | Scheidt | 713/176 |
| 2012/0226912 A1 | 9/2012 | King | |
| 2012/0239929 A1* | 9/2012 | Newman et al. | 713/168 |
| 2012/0284195 A1* | 11/2012 | McMillen et al. | 705/71 |
| 2013/0007857 A1* | 1/2013 | Li | 726/6 |
| 2013/0067857 A1* | 3/2013 | McDaid et al. | 53/77 |
| 2013/0212368 A1* | 8/2013 | Peng et al. | 713/2 |

OTHER PUBLICATIONS

Corresponding PCT International Application No. PCT/CA2013/000549 Written Opinion of the International Searching Authority mailing dated Sep. 27, 2013.

\* cited by examiner

SYSTEM AND METHOD FOR UNIFIED PASSCODE PROCESSING

FIELD OF INVENTION

The present invention relates generally to security, and more particularly to access control.

BACKGROUND

Operating a device can require multiple passwords or other security prompts to be entered to access its features. For example, at device startup a code for unlocking the device, and/or a code for registering the device on a network can be required. Additional passwords may also be needed to access additional features of the device such as work related functionality. Moreover, entering the wrong password multiple times can lead to a wiped device.

SUMMARY

According to an aspect a method is provided. The method can comprise:
receiving a unified passcode; and
generating a second passcode based on the unified passcode, the second passcode for unlocking access to a second module.

The unified passcode can be for unlocking access to a first module. The unlocking of access to the first module can allow access to a first set of features of the communication device. The method can further comprise:
generating a first passcode based on the unified passcode, the first passcode for unlocking access to a first set of features of the communication device.

The method can further comprise:
generating a third passcode based on the unified passcode, the third passcode for unlocking access to a second set of features of the communication device.

The second module can be a universal integrated circuit card (UICC) and unlocking access to the UICC can allow the communication device access to at least one application included on the UICC. The applications included can be selected from at least one of SIM, USIM, ISIM or CSIM. Moreover, the second passcode can be a personal identification number (PIN) for a universal integrated circuit card. Additionally, the generating can comprise encoding the unified passcode. The encoding can comprise hashing the unified passcode.

The generating can further comprise:
encoding the unified passcode;
receiving an offset; and
determining the second passcode based on the encoded unified passcode and the offset.

The offset can be based on a difference between the encoded unified passcode and a stored reference code associated with the second module. The stored reference code can be a personal identification number (PIN).

The method can further comprise:
unlocking access to the UICC, the unlocking comprising:
sending the second passcode to the UICC for authentication.

The authentication can be based on an alphanumeric reference code stored at a key reference reserved for future use. The key reference can be between '12' and '1E'. The access condition granted by the authentication can be the same as that granted by a universal PIN. The method can further comprise receiving a flag indicating the use of said alphanumeric reference code for authenticating said second code.

The method can further comprise:
receiving a selection indicating modules to unlock; and
unlocking modules indicated in the selection.

According to another aspect a device is provided. The device can comprise:
a processor configured for:
receiving a unified passcode; and
generating a second passcode based on the unified passcode, the second passcode for unlocking access to a second module.

The second module can be a universal integrated circuit card (UICC), and the device can further comprise an interface for connecting to the UICC. The processor can be further configured for sending the second passcode through the interface for authentication. The processor can be further configured for accessing at least one application included on the UICC through the interface.

DETAILED DESCRIPTION

Figure 1:
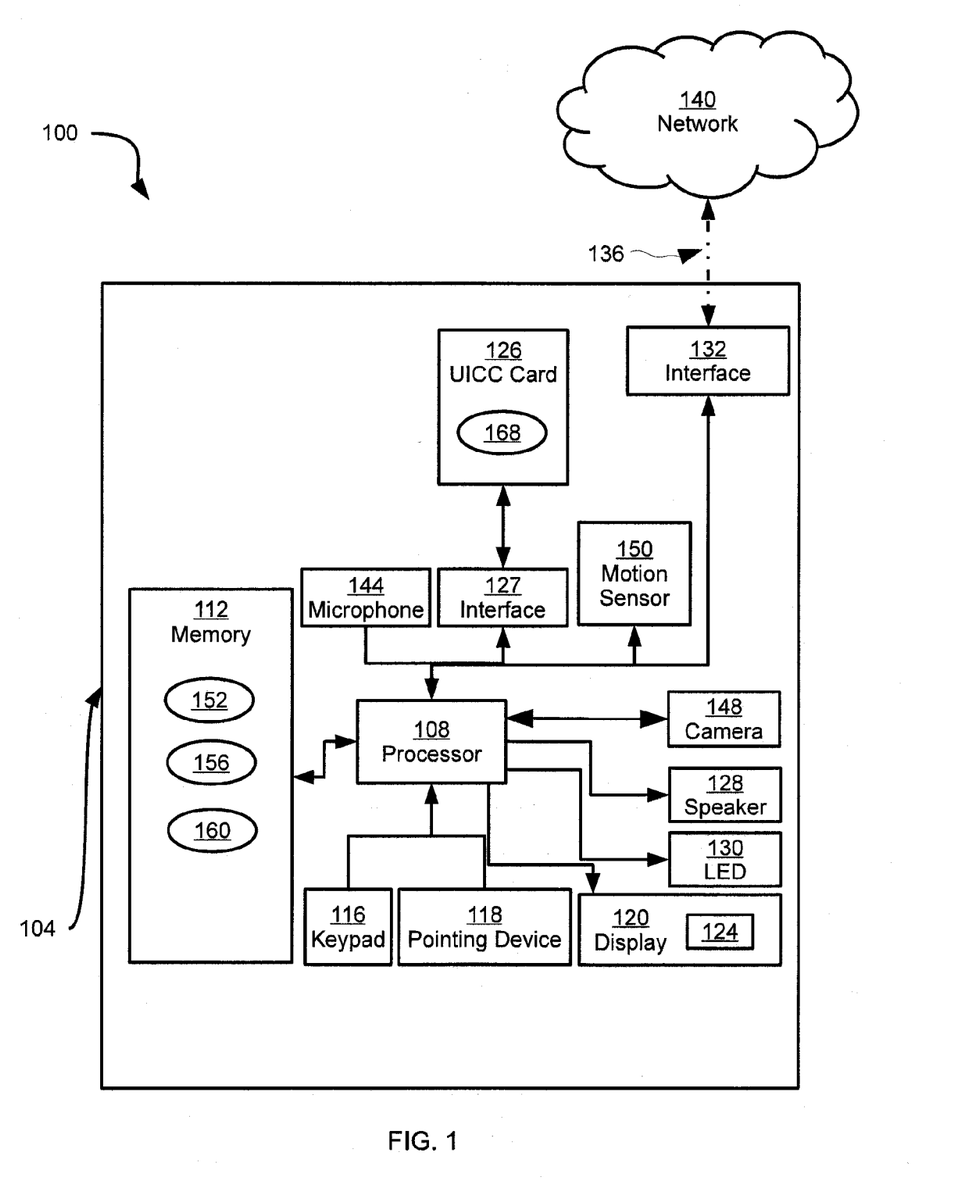
FIG. 1 shows a block diagram of an aspect of a system for unified passcode processing.

FIG. 1 depicts a communications system 100. System 100 includes a communication device 104, which in the present example is based on the computing environment and functionality of a hand-held wireless communication device. Communication device 104 is not limited to a hand-held wireless communication device, however. Other devices are also contemplated, such as cellular telephones, smart telephones, Personal Digital Assistants ("PDAs"), media (e.g. MP3) players, laptop computers, tablet computers and the like. In other examples, communication device 104 can be a computing device such as a desktop computer, an embedded computer or other computing device.

Communication device 104 includes at least one main processor 108 that controls the overall operation of the communication device 104. The communication device 104 is interconnected with a non-transitory computer readable storage medium such as a memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 112 includes both a volatile memory and a non-volatile memory. Other types of non-transitory computer readable storage medium are also contemplated, such as compact discs (CD-ROM, CD-RW), digital video discs (DVD), secure digital (SD) cards and variants thereof.

Communication device 104 also includes one or more input devices interconnected with main processor 108. Such input devices are configured to receive input and provide data representative of such input to processor 108. Input devices can include, for example, a keypad 116 and a pointing device 118. Thus, keypad 116 can receive input in the form of the depression of one or more keys, and can then provide data representative of such input to processor 108. The data provided to processor 108 can be, for example, an American Standard Code for Information Interchange (ASCII) value for each of the depressed keys. Keypad 116 can be a full QWERTY keypad, a reduced QWERTY keypad or any other suitable arrangement of keys. A pointing device can be implemented as a computer mouse, track ball, track wheel, touchscreen or any suitable combination thereof. In some examples, a computing device can include additional input devices in the form of one or more additional buttons, light sensors, microphones and the like. Pointing device 118 can receive input in the form of movement, pressure or swipe gestures, and can then provide data representative of such input to processor 108 in the form of, for example, coordinates representing the location of a virtual cursor, the direction and/or velocity of a swipe gesture, and the like.

In some examples, communication device 104 can include additional input devices in the form of one or more microphones 144, buttons, light sensors and the like. For example, the communications device 104 can include a camera (148), a fingerprint sensor (not shown), other biometric sensors (not shown), motion sensor (150) and others. In some implementations, one or more of these input devices can provide information that can be used as, for example, passcode substitutes for unlocking the communication device 104. For example, gestures, either on a touchscreen or in the air detected via a camera or other sensors can be used to unlock a device. In other examples, faces or voice recognition can be used to unlock a device. Other sensors and mechanisms for unlocking a device or for providing passcode substitutes will now occur to a person of skill in the art. More generally, any suitable combination of the above-mentioned input devices can be incorporated into communication device 104.

Communication device 104 further includes one or more output devices. The output devices of communication device 104 include a display 120. Display 120 includes display circuitry 124 controllable by processor 108 for generating interfaces which include representations of data and/or applications maintained in memory 112. Display 120 includes a flat panel display comprising any one of, or any suitable combination of, a Liquid Crystal Display (LCD), a plasma display, an Organic Light Emitting Diode (OLED) display, and the like. Circuitry 124 can thus include any suitable combination of display buffers, transistors, LCD cells, plasma cells, phosphors, LEDs and the like. When the input devices of communication device 104 include a touch screen input device, the touch screen (not shown) can be integrated with display 120.

The output devices of communication device 104 can also include a speaker 128 interconnected with processor 108. Additional output devices are also contemplated including, for example, a light-emitting indicator in the form of a Light-Emitting Diode (LED) 130, and a motor or other mechanical output device (not shown) for causing communication device 104 to vibrate. In general, communication device 104 can include any suitable combination of the above-mentioned output devices, and may also include other suitable output devices.

Communication device 104 also includes a communications interface 132 interconnected with processor 108. Communications interface 132 allows communication device 104 to perform voice and data communications via a link 136, which can be wired and/or wireless, and a network 140. The communication interface 132 receives messages from and sends messages to network 140. In this exemplary implementation of the communications device 104, the communication interface 132 is configured in accordance with the Universal Mobile Telecommunications Service (UMTS) standard. New standards are still being defined, but it is expected that they will have similarities to the network behavior described herein, and it will also be understood by persons skilled in the art that the various computing devices described herein are intended to use any other suitable standards that are developed in the future. The link 136 connecting the communication interface 132 with the wireless network 140 represents one or more different Radio Frequency (RF) channels, operating according to defined protocols specified for UMTS communications.

Although the network 140 associated with communications device 104 is a UMTS wireless network in this exemplary implementation, other wireless networks may also be associated with the communications device 104 in variant implementations. The different types of wireless networks that may be employed include, for example, but are not limited to, Code Division Multiple Access (CDMA) or CDMA2000 networks, GSM/GPRS networks (as mentioned above), third-generation (3G) networks like EDGE and UMTS (as mentioned above), and fourth generation networks like long term evolution (LTE). Some other examples of wireless networks include Institute of Electrical and Electronic Engineers (IEEE) 802.11 (WiFi), Mobitex™ and DataTAC™, Personal Communication Systems (PCS) networks like GSM and Time Division Multiple Access (TDMA) systems.

Communications interface 132 can also allow communication device 104 to communicate with other computing devices via a short range communications link (not shown), such as a Bluetooth™ link.

Communications interface 132 is selected for compatibility with link 136 and network 140, as well as with local links such as Bluetooth™. Communications interface 132 thus includes one or more transmitter/receiver assemblies, or radios, and associated circuitry. For example, communications interface 132 can include a first assembly, or radio, for enabling communications over a WiFi network, and a second radio for enabling communications over one or more mobile telephone networks (e.g. 3G networks). In some implementations, communications interface 132 can also be configured to allow communications through wired links 136 such as Ethernet.

In use, a received signal or data message such as a text message, an e-mail message, or web page download will be processed by the communication interface 132 and input to the processor 108. The main processor 108 will then process the received signal for output to the display 120 or other output devices as appropriate. A composed item such as a message can be transmitted over the wireless network 140 through the communication interface 132.

For voice communications, the overall operation of the communications device 104 is substantially similar, except that the received signals are output to the speaker 128, and signals for transmission are generated by a microphone 144.

The communications device 104 may send and receive communication signals over the network 140 to access services such as telephone calls, emails, Short Message Service (SMS) messages, Instant Message (IM) messages, and the like. The extent of network access and availability of services, however, is typically based on a subscriber account associated with the communications device 104. In order to access at least some of the network services available, the communications device 104 is registered with the network 140 by identifying and authenticating the subscriber account associated with the device.

A universal integrated circuit card (UICC) card 126 (colloquially known as a SIM or a RUIM card) is typically employed for maintaining identifier data for a subscriber account. The UICC card 126 is a smart card that includes a processor and memory for storing information. The identifier data maintained on the UICC card 126 is employed for registering the device to the network 140 and includes data such as an International Mobile Subscriber Identity (IMSI) and the related authentication key. The UICC card 126 can also include additional subscriber account data such as a contacts data-store. The UICC card 126 is one type of a conventional "smart card" that can be used to maintain subscriber account data. The UICC card 126 can be a removable card, an embedded module physically attached to the device, a logical module inside a system-on-a-chip (SoC) or a logical module running in software. In variations, other types of cards or storage modules for maintaining subscriber account information that will now occur to a person of skill in the art can be used. In yet other variations, subscriber account data can be stored in memory 112.

Using a UICC card 126 for maintaining subscriber account data can be advantageous in that a device can be associated with different subscriber accounts by changing the UICC card 126. In variations, however, the subscriber account data can be maintained on the device itself such as on the memory 112.

The registration with the network 140 is performed by accessing the subscriber account identifier data maintained on the UICC card 126, and sending that data to network 140 for registration purposes through the communications interface 132. In order to access subscriber account data, the UICC card 126 is inserted into a card interface 127. Once the UICC card 126 is inserted into the card interface 127, it is coupled to the main processor 108 allowing communication between the UICC card 126 and the main processor 108.

UICC card 126 can include application modules 168 for performing different functions, such as accessing data and enabling registration with different communication interfaces. For example, one or more of a universal subscriber identity module (USIM), subscriber identity module (SIM), IP multimedia services identity module (ISIM) and CDMA Subscriber Identity Module (CSIM) can be maintained on UICC card 126 to enable access to UMTS, GSM, CDMA and other networks. Other application modules exist for accessing and maintaining information maintained on a UICC card and new application modules are being developed. It will be understood by those of skill in the art that the UICC card 126 is intended to use any suitable application module that currently exist or is developed in the future.

To register the communications device 104 with the UMTS network, the main processor 108 accesses the identifier data by accessing USIM application module maintained on the UICC card 126. For example, processor 108 can access the IMSI maintained on the UICC card 126 through USIM application module and cause the IMSI to be transmitted to the network 140.

To secure against wrongful access and modification of the subscriber account data maintained on UICC card 126 (and hence improper access to services offered by the network 140), access to application modules 168 can be locked using a personal identification number (PIN) as described in ETSI TS 102 221 V11.0 (2012-06) and 3GPP TS 21.111 v11.0.1 (2012-11). When access is secured or locked, certain operations pertaining to UICC card 126, such as network registration and access, modification of the subscriber account data and others may not be allowed. For example, when a device is stolen, even if access to that device is secured through other means, a UICC card can be removed and inserted into another device to access a network. On the other hand, when access to the UICC card is locked, a network registration cannot be performed without unlocking the UICC even if the UICC card is moved to another device, thus providing security for the subscriber account data and network services access. Activation of the locking functionality of the UICC card 126 can be optional.

Communication device 104 maintains, in memory 112, a plurality of computer readable instructions executable by processor 108. Such instructions can include, for example, an operating system and a variety of other applications. For example, as illustrated in FIG. 1, communication device 104 stores a unified-unlock application 152, a passcode setup application 156 and a secure-work application 160.

When processor 108 executes the instructions of application 152, 156 or 160, processor 108 is configured to perform various functions implemented by the computer readable instructions of the respective applications. It is contemplated that memory 112 can store a variety of additional applications, such as a calendar application, a telephony application, a web browsing application, and the like (not shown).

In general, processor 108 is configured, via the execution of unified-unlock application 152, to change the access status of a module. Modules include communications device 104 and its components and applications as well as any other components operably connected to the communications device 104 such as the UICC card 126 and its applications and components. For example, the unified-unlock application 152, when executed by processor 108, can unlock the communications device 104 (also known as a device unlock). Unlocking the communications device 104 allows access to at least some of its features such as telephony functions, messaging functions and other functions that will now occur to a person of skill in the art. As a further example, the unified-unlock application 152 can unlock the UICC card 126 allowing access to some of its features such as the subscriber account data. The use of the unified-unlock application 152 can be optional. In some implementations at least part of the functionality of unified-unlock application 152 can be provided through hardware components such as encryption/decryption modules (not shown). In some implementations at least part of the functionality of unified-unlock application 152 can be provided through other software applications (not shown) residing in memory 112 or on UICC card 126, for example.

The communications device 104 also includes a passcode setup application 156. In general, processor 108 is configured, via the execution of application 156, to allow the setting of reference passcodes which are used, for example, by the unified-unlock application 152 when unlocking access to the communications device 104 and other modules. In some implementations, at least part of the functionality of passcode setup application 156 can be provided through hardware components such as encryption/decryption modules (not shown). In some implementations at least part of the functionality of passcode setup application 156 can be provided through other software applications (not shown) residing in memory 112 or on UICC card 126, for example.

Communications device 104 further includes a secure-work application 160. In general, processor 108 is configured, via the execution of application 160, to maintain work related data, resources and other applications that are used in the operation of the secure-work application 160. By keeping work related features of communications device 104 separate from device features indicated for other use, additional security can be gained for work related features. For example, the risk of accidental disclosure of work related data by being co-mingled with personal data can be typically reduced.

The secure operation of the secure-work application 160 can be assisted by the unified-unlock application 152. In general, processor 108 is configured, via the execution of application 152 to unlock access to the secure-work module 160 based on a received passcode. Thus, once the secure-work application 160 is unlocked with unified unlock application 152, the secure-work application 160 can be executed by processor 108 to allow access to additional features of communications device 104 as provided by the execution of secure-work application 160. In variations, secure-work application 160 can be unlocked without unlocking the communications device 104, thus allowing access to secure-work application 160 without unlocking other features of the communications device 104.

Prompting for multiple passwords in multiple steps to allow access to different features and services accessible through the device can be cumbersome. In some cases, this can lead to reduced security by having the passwords set to the same code, or turned off altogether to reduce complexity. A system and method is provided to enable the use of a single password to unlock multiple modules to reduce complexity by reducing several security steps including prompts to a single step.

Figure 2:
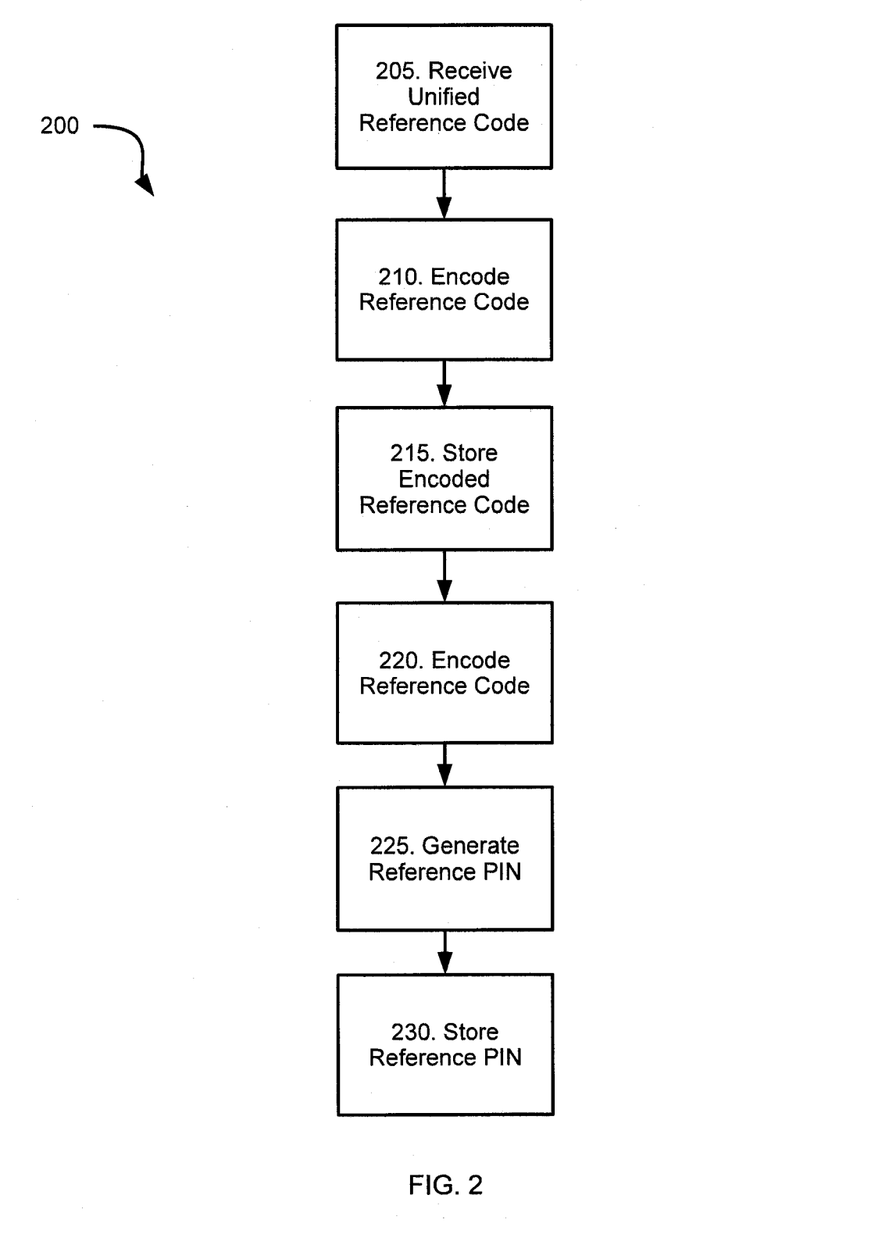
FIG. 2 shows a flow chart indicating an exemplary method of unified passcode setting.

Referring now to FIG. 2, a method for setting a unified reference passcode is indicated at 200. In order to assist in the explanation of the method, it'll be assumed that method 200 is operated using system 100 as shown in FIG. 1. Additionally, the following discussion of method 200 leads to further understanding of system 100. However, it is to be understood that system 100, and method 200 can be varied, and need not work exactly as discussed herein in conjunction with each other, and that such variations are within scope.

Referring now to method 200, at 205 a unified reference code is received. The received reference code can take the form of a variable length alphanumeric device password, a gesture based unlock code, a biometric scan, voice based code, video based code or others that will now occur to a person of skill in the art. The particular form a code can take can also be governed by policies maintained on communications device 104. The reference code can be received during the initial setup of device 100, or at any time during the operation of the device 100 through the operations of the password setup application 156. It'll be assumed that the received reference code for this example is "password12".

Next, at 210 the received reference code is encoded. In cases where the received reference code is not an alphanumeric code (such as biometric, voice, image or gesture based codes), the received reference code can be converted to an alphanumeric representation such as vectors representing acute-angle corners in a gesture.

There are various mechanisms that can be utilized for encoding the received reference code including functions such as cryptographic hash functions. A cryptographic hash function such as SHA-256 as described in FIPS 180-4 (March 2012), secure hash standard takes an arbitrary block of data and returns a fixed-size bit string. The output bit string is called a hash value. A hash function is typically designed such that even small changes to the input data will, with high probability, cause a change to the hash value. In variations, to further decrease the likelihood that the two different inputs will have the same encoded hash value, the inputs to the hash function can be padded, or salted, with several additional digits. Accordingly, in a variation, the received reference code can be salted. The salt can be stored in memory 112 or in UICC 126 for future use. Continuing with the present example, a hash value for the received reference code (hereafter referred to as H1(ref)) is generated.

Continuing with method 200, at 215 the encoded reference code is stored. Accordingly, the hash value of the received reference code, H1(ref), generated at 210, is stored in memory 112 as a reference passcode for use in subsequent device unlock by unified-unlock application 152. In variations, H1(ref) can be stored in other suitable storage elements of the communications device 104, or alternatively off device and on such apparatus as smart card authentication systems which are used for authenticating a subscriber account to a device. In further variations, the portion of the storage element containing H1(ref) can be secured with access restrictions.

Continuing with FIG. 2, at 220 the received reference code is once again encoded. In this example, a hashing function different from the one employed at 210 is used to generate a different hash value H2(ref). It will be assumed that for the present example H2(ref) is 4356758201. In variations, the same encoding function as that used at 210 can be employed to generate a resulting hash value for the received reference code. In these variations, 220 can be skipped and the resulting hash value from 210 can be used.

Referring again to FIG. 2, at 225 a reference PIN is generated based on the received reference code. Accordingly, the received reference code is converted to a reference PIN. In this example, the PIN used for UICC card 126 is a universal PIN, which once authenticated, allows access to the functionality of the UICC card 126 as described in s.9.4 of ETSI TS 102 221 V11.0 (2012-06). The PIN for UICC card 126 is of numeric type.

To generate the reference PIN, in the present example, the maximum length of the PIN allowed by UICC card 126 can be previously stored in communications device 104. Alternatively, the maximum PIN length available (referred to hereafter as SIMPINMaxLength) can be determined by querying the UICC card 126 with a function call. In the present example, the maximum allowable length is assumed to be 4. In variations, the PIN can have different length of digits, for example between four and eight digits. Next, ten to the power of SIMPINMaxLength is determined, which provides a mask number with SIMPINMaxLength+1 digits, the last SIMPINMaxLength digits of the number being 0. For example, where the SIMPINMaxLength is 4, as in the present example implementation, the generated mask number is 10000, with the last four digits being 0. Next a remainder or modulo is calculated from the H2(ref) based on the mask number, which in this case is 8201, the last four digits of H2(ref). In variations, a mask that allows the generation of a PIN with a length less than the maximum allowable length can be used.

Continuing with FIG. 2, at 230, the generated reference PIN is stored at UICC card 126 as a reference PIN for use in subsequent unlocking of the UICC card 126 by unified-unlock application 152.

Figure 3:
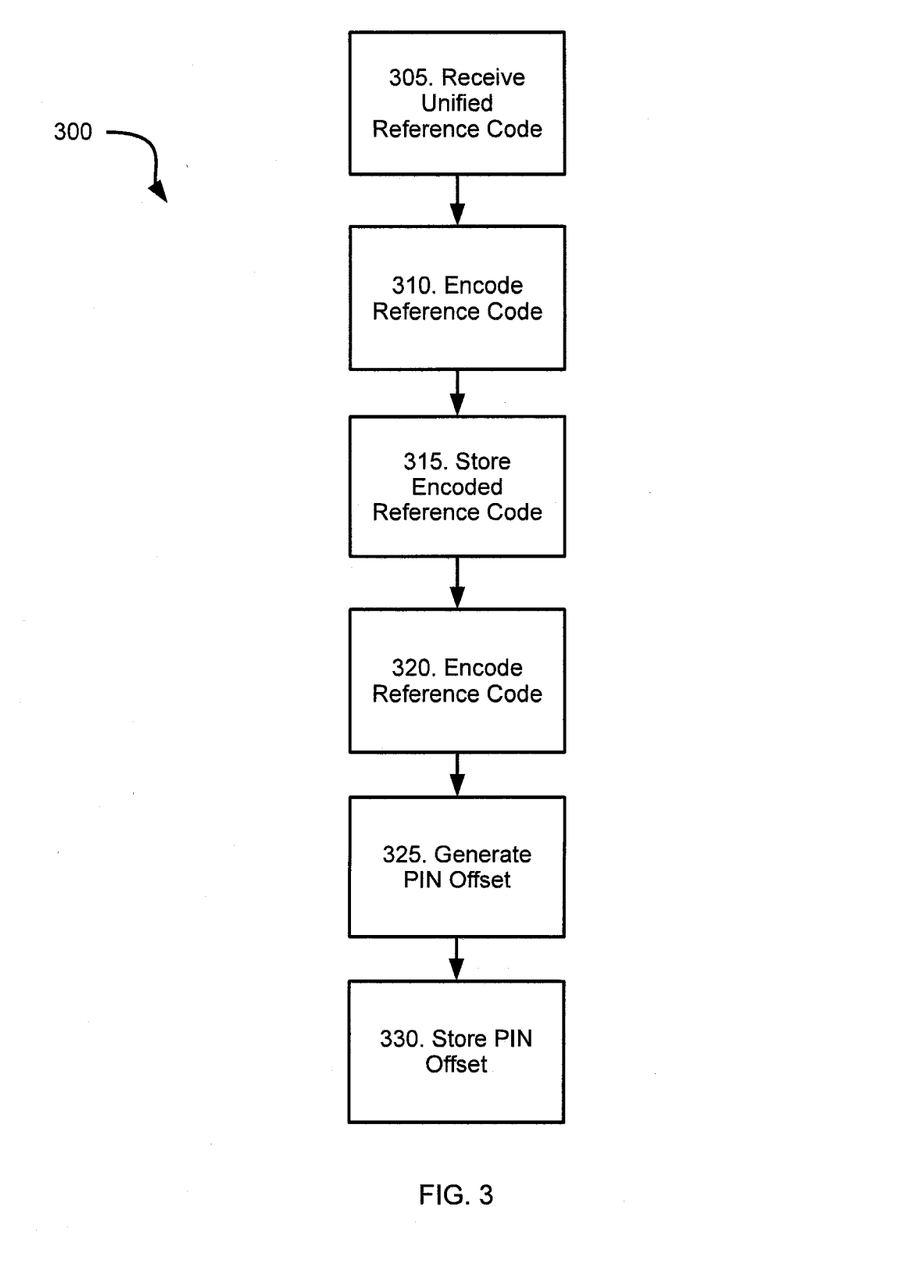
FIG. 3 shows a flow chart indicating another exemplary method of unified passcode setting.

In some implementations, use of an offset value can be employed in order to avoid changing the PIN on the UICC card 126. Referring now to FIG. 3, a method for setting a unified passcode based on an offset is indicated at 300. In order to assist in the explanation of the method, it'll be assumed that method 300 is operated using system 100 as shown in FIG. 1. Additionally, the following discussion of method 300 leads to further understanding of system 100. However, it is to be understood that system 100, and method 300 can be varied, and need not work exactly as discussed herein in conjunction with each other, and that such variations are within scope.

At 305 a unified reference code is received. The received reference code can take the form of a variable length alphanumeric device password, a gesture based unlock code, a biometric scan, voice code, video based code or others that will now occur to a person of skill in the art. The particular form a code can take can also be governed by policies maintained on communications device 104. The reference code can be received during the initial setup of device 100, or at any time during the operation of the device 100 through the operations of the password setup application 156. It'll be assumed that the received reference for this example is "password12".

Next, at 310 the received reference code is encoded. In cases where the reference code is not an alphanumeric code (such as biometric, voice, image or gesture based codes), the received reference code can be converted to an alphanumeric representation such as vectors representing acute-angle corners in a gesture.

There are various methods that can be utilized for encoding the reference code including functions such as a cryptographic hash function as described above. Accordingly, in the present example, a hash value for the received reference code (hereafter referred to as H3(ref)) is generated.

Continuing with method 300, at 315 the encoded reference code is stored. Accordingly, the hash value of the received reference code, H3(ref), generated at 310 is stored in memory 112 as a reference passcode for use in subsequent device unlock by unified-unlock application 152. In variations, H3(ref) can be stored in other suitable storage elements of the communications device 104, or alternatively off device and on such apparatus as smart card authentication systems which are used for authenticating a subscriber account to a device. In further variations, the portion of the storage element containing H3(ref) can be secured with access restrictions.

Continuing with FIG. 3, at 320 the received reference code is once again encoded. In this example a hashing function different from the one employed at 310 is used to generate a different hash value H4(ref). It will be assumed that for the present example H4(ref) is 4356758201. In variations, the same encoding function as that used at 310 can be employed to generate a resulting hash value for the received reference code. In these variations, 320 can be skipped and the resulting hash value from 310 can be used.

Referring again to FIG. 3, at 325 a PIN offset is generated based on the received reference code. Accordingly, the received reference code is converted to a PIN offset value. In this example, the PIN for UICC card 126 is a universal PIN, which once authenticated, allows access to the functionality of the UICC card 126 as described in s.9.4 of ETSI TS 102 221 V11.0(2012-06). The PIN for UICC card 126 is of numeric type and allows codes up to four digits. In variations, the PIN can have different length of digits, for example between four and eight digits.

To generate the PIN offset, in the present example, the length and value of the reference PIN currently maintained by UICC card 126 is determined. In some variations, this determination can be performed by querying the UICC card 126 with a function call to retrieve the length and value of the PIN. Typically, however, this information cannot be obtained from the UICC card 126 to increase the security of the subscriber account data. Accordingly, the information can be received through various prompts as provisioned by appropriate interfaces utilizing various input/output elements of communications device 104. In the present example, it'll be assumed that the length of the PIN is 6 and the present value is 123456.

Next, ten to the power of PIN length (hereafter referred to as PINLENGTH) is determined, which provides a mask number with PINLENGTH+1 digits, the last PINLENGTH digits of the number being 0. For example, where PINLENGTH is 6, as in the present example implementation, the generated mask number is 1000000, with the last six digits being 0. Next a remainder or modulo is calculated from the H4(ref) based on the mask number, which in this case is 758201, the last six digits of H4(ref).

The PIN offset is then calculated indicating the difference between the remainder and the reference PIN maintained on the UICC card 126. In this example, the difference can be based on a subtraction such that the PIN offset is 634475 (758201-123456). In variations bitwise XOR or other operations can be used to determine the difference and hence the offset value.

Continuing with FIG. 3, at 330, the generated PIN offset and the received PIN length, PINLENGTH, are stored in memory 112 for use in subsequent unlocking of the UICC card 126 by unified-unlock application 152. In variations, generated PIN offset and the received PIN length can be stored in other suitable storage elements of the communications device 104, or alternatively off device and on such apparatus as smart card authentication systems which are used for authenticating a subscriber to a device. In further variations, the portion of the storage element containing the PIN offset and PIN length can be secured with access restrictions.

Various other methods can be utilized for performing the conversion of a reference code to a reference PIN or a PIN offset as it will now occur to a person of skill in the art. For example, a mask can be applied to the start or the middle of the encoded reference, or other operations can be used to reduce the length of the encoded reference code to the length of the PIN, while converting the format of the reference code to a format suitable for a PIN. In other variations, the received reference code itself, without encoding, can be converted to a PIN or a PIN offset. In further variations where the length of the received reference code is less than the length of the PIN, padding can be used as part of the conversion process where one of the received reference code or the encoded reference code or the generated PIN can be padded with a number of digits or characters such that the resulting reference PIN or PIN offset has the requisite length. Other variations will now occur to a person of skill in the art for converting the format of the reference code to a format suitable for a PIN or a PIN offset.

In some implementations, PINs other than or in addition to a Universal PIN are possible. For example, as described in s.9.4 of ETSI TS 102 221 V11.0 (2012-06), there can be Application PINs and Local PINs. Accordingly, for example, each of the application modules on UICC card 126 can have a different PIN associated for unlocking that application module's functionality. In these cases, the method for conversion from a received reference code to a PIN or a PIN offset can be iterated multiple times to generate as many reference PINs or PIN offsets as desired. In some implementations, the iterations can use the same received reference code. In these implementations one or more of the operations can be varied, such as encoding or masking function can be varied, to generate a different value for each reference PIN or PIN offset, thus supporting multiple different PIN codes.

In some implementations the reference PINs and passcodes generated by methods 200 and 300 can be made available through the output devices of communications device 104. Accordingly, the modules secured with the aid of those reference PINs and passcodes can be unlocked individually through traditional means.

In other implementations, unified passcodes can be set for other elements or modules of the communications device 104 or UICC card 126, or others. For example, instead of or in addition to generating a reference PIN using method 200, or an offset PIN with method 300, a reference passcode or an offset to a reference passcode can be generated for the secure-work application 160, allowing the access of the work module with the unified passcode as well. In variations, the multiple reference passcodes generated for different modules can be different.

During operation, the communication device 104 and UICC card 126 can enter locked state through various mechanisms. For example, a period of device inactivity can be timed and if the calculated period exceeds a threshold, the device can be locked restricting access. Alternatively, the device can be locked through an input received through one or more of various input devices, indicating that the device is to be locked. In variations, the device and the UICC card 126 can enter a locked state by powering down the device. Other mechanisms for causing a device to enter a locked state will now occur to a person of skill in the art.

When the device is in a locked state and access to the communications device 104 and UICC card 126 is locked, at various stages during the operation of the communication device 104, such as when the device is first turned on, unified-unlock application 152 can be executed by processor 108 to unlock the device 100 and UICC card 126 based on a unified password.

Figure 4:
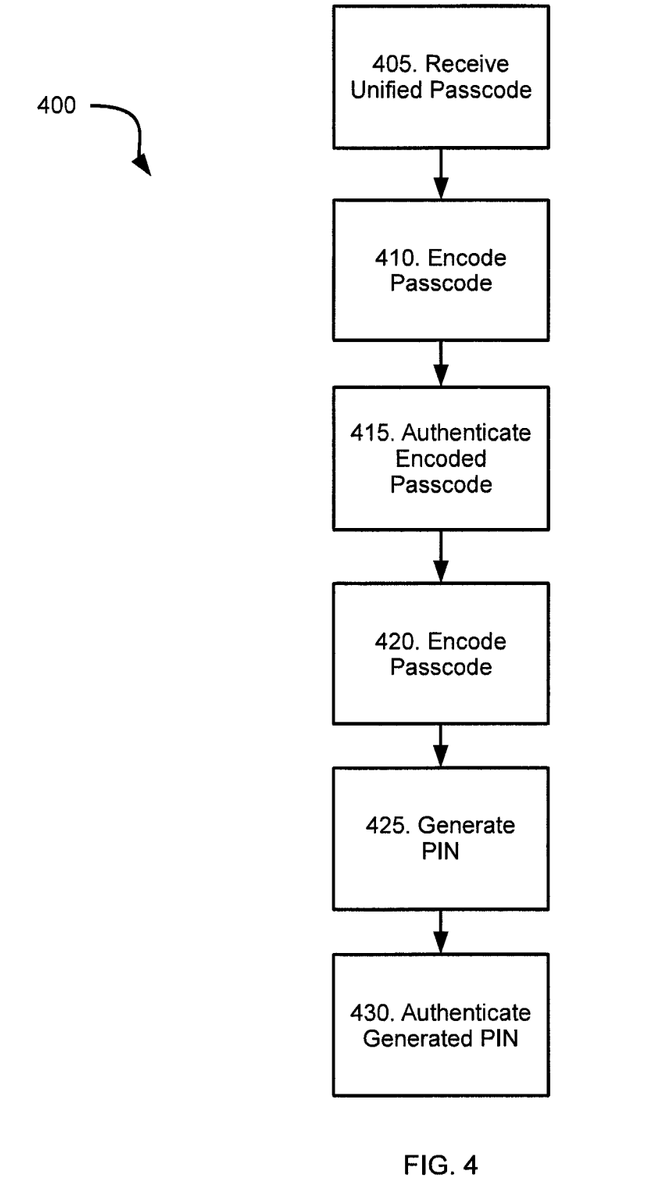
FIG. 4 shows a flow chart indicating an exemplary method of unlocking access with a unified password.

Referring to FIG. 4, a method of unlocking a device based on a unified passcode is indicated at 400. In order to assist in the explanation of the method, it'll be assumed that method 400 is operated using system 100 as shown in FIG. 1. Additionally, the following discussion of method 400 leads to further understanding of system 100. However, it is to be understood that system 100, and method 400 can be varied, and need not work exactly as discussed herein in conjunction with each other, and that such variations are within scope.

Referring now to method 400, at 405 a unified passcode is received. The received passcode can take the form of a variable length alphanumeric device password, a gesture based unlock code, a biometric scan, voice based code, video based code or others that will now occur to a person of skill in the art. The particular form a code can take can also be governed by policies maintained on communications device 104. The reference code can be received during the initial startup of communications device 104, or at any time during the operation of the communications device 104 through the operations of the unified-unlock application 152. It'll be assumed that the received reference code for this example is "password12".

Next, at 410 the passcode is encoded. In cases where the passcode is not an alphanumeric code (such as biometric, voice, image or gesture based), the passcode code can be converted to an alphanumeric representation such as vectors representing acute-angle corners in a gesture.

There are various mechanisms that can be utilized for encoding the passcode code including functions such as cryptographic hash functions. Accordingly, in the present example, a hash value for the reference code (hereafter referred to as H5(ref)) is generated.

Continuing with method 400, at 415 the encoded passcode is authenticated. Accordingly, the hash value of the reference code, H5(ref), generated at 410 is compared against a reference passcode hash stored in memory 112 as a result of previously performing method 200 or 300 for example. If the received passcode is successfully authenticated against the stored reference code the communications device 104 is unlocked, for example allowing access to at least a portion of the communications device 104's features. In some implementations authentication is successful if the encoded passcode matches the stored reference code. In variations, if the authentication is unsuccessful, option to receive another passcode can be provided. In further variations, after a number of unsuccessful authentication attempts, the device may be more securely locked preventing unlocking using application 152, or the communications device 104 may be securely reformatted, erasing data and software applications, for example.

Continuing with FIG. 4, at 420 the received passcode code is once again encoded. In this example, a different hashing function then the one employed at 410 is used to generate a different hash value H6(ref). It will be assumed that for the present example H6(ref) is 4356758201. In variations, the same encoding function as that used at 410 can be employed to generate a result. In these variations, 420 can be skipped and the resulting hash value from 410 can be used.

Referring again to FIG. 4, at 425 a PIN is generated based on the received passcode. Accordingly, the received passcode is converted to the PIN. In this example, the PIN for UICC card 126 is a universal PIN, which once authenticated, allows access to the functionality of the UICC card 126 as described in s.9.4 of ETSI TS 102 221 V11.0 (2012-06). The PIN for UICC card 126 is of numeric type and allows codes up to four digits. In variations, the PIN can have different length of digits, for example between four and eight digits.

To generate the reference PIN, in the present example, the maximum length of the PIN allowed by UICC card 126 can be previously stored in communications device 104. Alternatively, the maximum PIN length available (referred to hereafter as SIMPINMaxLength) can be determined by querying the UICC card 126 with a function call in the present example, the maximum allowable length is assumed to be 4. In variations, the PIN can have different length of digits, for example between four and eight digits. Once the SIMPINMax-LENGTH is determined, ten to the power of SIMPINMax-Length is determined, which provides a mask number with SIMPINMaxLength+1 digits, the last SIMPINMaxLength digits of the number being 0. For example, where the SIM-PINMaxLength is 4, as in the present example implementation, the generated mask number is 10000, with the last four digits being 0. Next a remainder or modulo is calculated from the H6(ref) based on the mask number, which in this case is 8201, the last four digits of H6(ref). In variations, a mask that allows the generation of a PIN with a length less than the maximum allowable length can be used.

In an alternative implementation the communications device 104 maintains a PIN offset value. In this variation, the length of the reference PIN currently set at UICC card 126 is also maintained on the communications device 104 for use in generating a PIN. For example the PIN offset and the PIN length can be saved on communications device 104 as a result of performing method 300 on the device. In the present example, it'll be assumed that PIN length is 6 and the PIN offset value is 634475.

Next, ten to the power of PIN length (hereafter referred to as PINLENGTH) is determined, which provides a mask number with PINLENGTH+1 digits, the last PINLENGTH digits of the number being 0. For example, where PINLENGTH is 6, as in the present example implementation, the generated mask number is 1000000, with the last six digits being 0. Next a remainder or modulo is calculated from the H6(ref) based on the mask number, which in this case is 758201, the last six digits of H6(ref).

The PIN is then calculated indicating the difference between the remainder and the PIN offset. In this example, the difference can be based on a subtraction such that the calculated PIN is 123456 (758201-634475). In variations other operations can be used to the difference and hence the offset value.

Continuing with FIG. 4, at 430, the calculated PIN is authenticated against a reference PIN maintained by UICC card 126. In some variations, the reference PIN can be generated and stored on the basis of performing method 200. The UICC card 126 authenticates the calculated PIN against the reference PIN stored on the UICC card 126 and once the calculated PIN is authenticated, enters the UICC card 126 into an unlocked state, allowing access, to at least a portion of the UICC card 126's features such as access to subscriber account data. In variations, if the authentication is unsuccessful, option to receive another passcode can be provided. In further variations, after a number of unsuccessful authentication attempts, the UICC card 126 may be more securely locked preventing unlocking using the unified passcode, for example and requiring the entry of another PIN (PIN unlock code or PUK, for example).

In variations, a unified passcode may not be used as a passcode itself but serve as a basis for generating passcodes. In further variations, a unified reference code may not be used as reference code itself but serve as a basis for generating reference codes.

In some implementations, 420, 425 and 430 can be performed only when the received passcode is successfully authenticated against the device reference code at 415. In other implementations, performance of 420, 425 and 430 are not dependent on successful unlocking of the device. In other implementations, unified passcodes can be used for unlocking other elements or modules of the communications device 104 or UICC card 126. For example, instead of or in addition to unlocking a UICC card 126 PIN, the secure-work application 160 can be unlocked, allowing the access of the work module with the unified passcode as well. As a further example, multiple application PINs for access to applications maintained by UICC card 126 can also be unlocked using the unified passcode. It will now occur to a person of skill in the art that a unified passcode can be employed for unlocking various modules including the communication device 104, UICC card 126 and applications and components contained within one or both using variations of method 400. In other variations, the order in which modules are unlocked can vary.

In some implementations, the functionality of the UICC card 126 can be extended to allow the use of alphanumeric passcodes in addition to numeric PINs and these alphanumeric passcodes can be used in place of a PIN when performing methods 200, 300 or 400. Current UICC standard as indicated in Table 9.3 of ETSI TS 102 221 V11.0 (2012-06) provides for PIN mapping into key references. For example, in the security context, a single verification capable UICC uses key reference '01' as PIN and key reference '81' as PIN2. A multi-verification capable UICC uses key references range of '01' to '08' as PIN and key references from '81' to '88' as PIN2. Each of these many different PINs enable access to a unique security access condition. Moreover, key reference 11 is provided for the Universal PIN, the only PIN which can enable a global access condition. The key references of '12'-'1E' are currently reserved for future use and can define a universal password. Accordingly, the universal password can have formats such as length, character composition and others that are not restricted by the requirements for legacy PINs. The key reference '12' can be used to denote a universal password that is used in granting the same access granted by the universal PIN. UICC mobile equipment interface can also be updated to add a flag which indicates that the authentication can be done via the universal password as opposed to the universal PIN.

Figure 5:
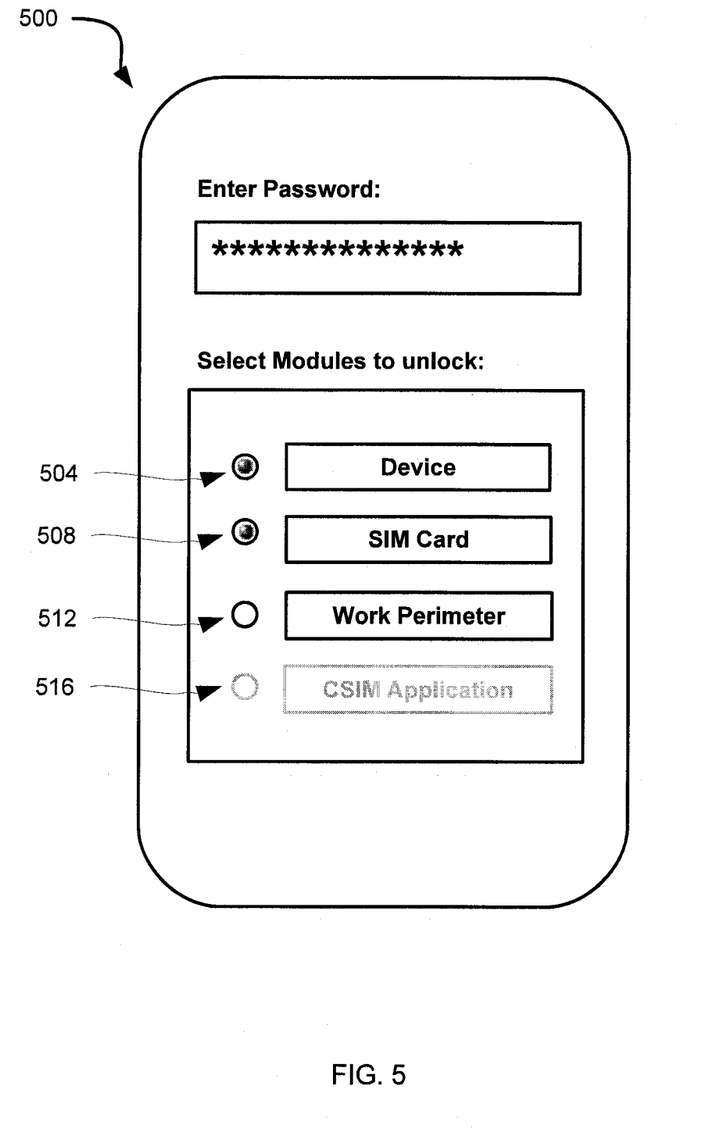
FIG. 5 shows an exemplary interface for unlocking access with a unified password.

In some implementations, an unlock user interface can be provided to allow a choice of unlocking one or more locked modules such as the communications device 104, the UICC card 126 or the secure-work application 160 using the unified pass code. Referring now to FIG. 5, an exemplary interface for unlock selection is shown at 500. It is to be understood that the example unlocking interface 500 is for illustrative purposes and aspects of the user interface may vary in some implementations.

Continuing with FIG. 5, selectors 504, 508, 512 and 516 allow for receiving a selection indicating which of the modules available for unlocking using the unified unlock application 552 are to be unlocked. For example, selector 504 and 508 are selected, indicating that the communication device 104 and the UICC card 126 are to be unlocked. On the other hand, selector 512 is not checked, indicating that the secure-work module is not to be unlocked. In variations, the selection of modules for unlocking can be stored and the stored selection can be used in place of presenting a query each time the method 400 is performed.

In variations, modules that are already unlocked or are not available for unlocking with a unified passcode can be detected, and those modules may be indicated in the unlocking interface 500 through various means such as graying out the selectors corresponding to the unlocked modules. For example, in FIG. 5, selector 516 is grayed out indicating that CSIM application is not available for unlocking or already unlocked. Although in this implementation, the selectors are indicated as radio buttons, in variations other methods of receiving selection can be used such as check boxes and others that will now occur to a person of skill in the art.

The above-described implementations are intended to be examples and alterations and modifications may be effected thereto, by those of skill in the art, without departing from the scope which is defined solely by the claims appended hereto.

We claim:

1. A method performed on a communication device, the method comprising:
receiving, by a first module of the communication device, a unified passcode, encoding the unified passcode using a first hash to generate a first encoded passcode, and the first module configured to be unlocked when the first encoded passcode matches a first stored encoded passcode;
generating, via the first module, a second encoded passcode at least partially based on a second hash of the unified passcode and based on an offset that is received, the second hash different from the first hash, by encoding the unified passcode using the second hash to generate the second encoded passcode, the second encoded passcode different from the first encoded passcode, the offset based on a difference between the second hash of the unified passcode and a stored reference code associated with a universal integrated circuit card (UICC); and
automatically unlocking access, via the second encoded passcode, to the UICC when the second encoded passcode matches a second stored encoded passcode, the UICC connected to the communication device, to allow the communication device to access at least one function of the UICC.

2. The method of claim 1 wherein unlocking access to the first module allows access to a first set of features of the communication device.

3. The method of claim 1 wherein the at least one function is selected from at least one of SIM, USIM, ISIM or CSIM.

4. The method of claim 1 wherein the second encoded passcode is a personal identification number (PIN) for the UICC.

5. The method of claim 1 wherein the stored reference code is a personal identification number (PIN).

6. The method of claim 1, wherein the automatically unlocking access further comprises:
sending the second encoded passcode to the UICC for authentication.

7. The method of claim 6 wherein the authentication is based on an alphanumeric reference code stored at a reserved key reference.

8. The method of claim 7 wherein the reserved key reference is between '12' and '1E'.

9. The method of claim 7 wherein an access condition granted by the authentication is the same as that granted by a universal PIN.

10. The method of claim 7 further comprising receiving a flag indicating the use of said alphanumeric reference code for authenticating said second code.

11. The method of claim 1 further comprising:
rendering, at display device, selectable options indicating respective modules to be unlocked at the communication device, the selectable options comprising at least: a first selectable option configured to unlock the first module when selected and a second selectable option configured to unlock functions at the UICC when selected;
receiving a selection of the second selectable option indicating the functions included on the UICC to unlock; and
unlocking the functions indicated in the selection.

12. The method of claim 1, wherein the generating the second encoded passcode occurs only when the first encoded passcode matches the first stored encoded passcode.

13. A device comprising:
a hardware processor configured to:
receive, by a first module, a unified passcode, encode the unified passcode using a first hash to generate a first encoded passcode, and the first module configured to be unlocked when the first encoded passcode matches a first stored encoded passcode;
generate, via the first module, a second encoded passcode at least partially based on a second hash of the unified passcode and based on an offset that is received, the second hash different from the first hash, by encoding the unified passcode using the second hash to generate the second encoded passcode, the second encoded passcode different from the first encoded passcode, the offset based on a difference between the second hash of the unified passcode and a stored reference code associated with a universal integrated circuit card (UICC); and
automatically unlock access, via the second encoded passcode, to the UICC when the second encoded passcode matches a second stored encoded passcode, the UICC connected to the communication device, to allow the communication device to access at least one function of the UICC.

14. The device of claim 13 further comprising:
an interface for connecting to the UICC;
the processor further configured to send the second encoded passcode through the interface for authentication.

15. The device of claim 14 wherein the processor is further configured to:
access the at least one function on the UICC through the interface.

16. The device of claim 13 further comprising a display device, the processor further configured to:
render, at display device, selectable options indicating respective modules to be unlocked at the communication device, the selectable options comprising at least: a first selectable option configured to unlock the first module when selected and a second selectable option configured to unlock functions at the UICC when selected;
receive a selection of the second selectable option indicating the functions included on the UICC to unlock; and
unlock the functions indicated in the selection.

17. The device of claim 13, wherein the processor is further configured to generate the second encoded passcode only when the first encoded passcode matches the first stored encoded passcode.

* * * * *